US012798368B2

(12) United States Patent
Langlotz

(10) Patent No.: US 12,798,368 B2
(45) Date of Patent: Nov. 17, 2026

(54) VEHICLE SYSTEM TO MITIGATE UNINTENDED DIRECTIONAL ACCELERATION

(71) Applicant: Bulletproof Property Management, LLC, Cheyenne, WY (US)

(72) Inventor: Bennet Langlotz, Dallas, TX (US)

(73) Assignee: BULLETPROOF PROPERTY MANAGEMENT, LLC, Cheyenne, WY (US)

( * ) Notice: Subject to any disclaimer, the term of this patent is extended or adjusted under 35 U.S.C. 154(b) by 0 days.

(21) Appl. No.: 19/176,823

(22) Filed: Apr. 11, 2025

(65) Prior Publication Data

US 2025/0326293 A1 Oct. 23, 2025

Related U.S. Application Data

(60) Provisional application No. 63/635,108, filed on Apr. 17, 2024.

(51) Int. Cl.
*B60K 26/02* (2006.01)

(52) U.S. Cl.
CPC .................................... *B60K 26/02* (2013.01)

(58) Field of Classification Search
CPC ...................................................... B60K 26/02
See application file for complete search history.

(56) References Cited

U.S. PATENT DOCUMENTS 9,085,321 B2 7/2015 Noh
9,219,887 B2 12/2015 Iga et al.
9,381,922 B2 7/2016 Wysietzki et al.
11,001,301 B2 5/2021 Joos et al.
11,623,636 B2 4/2023 Tsujino et al.
12,049,217 B2 7/2024 Hashimoto
12,065,130 B2 8/2024 Chen et al.
12,084,047 B2 9/2024 Hiei et al.
12,151,677 B2 11/2024 Tamori
(Continued)

OTHER PUBLICATIONS

CNET Cars, "Elon Musk explains Auto Shift feature in Model S," YouTube, https://www.youtube.com/watch?V=R4bskxzZvEA, Jun. 11, 2021, Accessed Mar. 25, 2024.
(Continued)

*Primary Examiner* — George C Jin
(74) *Attorney, Agent, or Firm* — Bennet K. Langlotz; Langlotz Patent & Trademark Works, LLC

(57) ABSTRACT

A vehicle system to mitigate unintended directional acceleration has an accelerator pedal operable by a driver through a range of positions between a minimum throttle angle and a maximum throttle angle, a drive system operable to selectably drive the wheels in a forward direction in a drive mode and in a rearward direction in a reverse mode, the drive system including a direction controller operable to enact a direction change between the drive mode and the reverse mode, the drive system operable in a standard mode to drive the motor with a first response curve based on the accelerator position, and the drive system operable in a safe mode immediately after the direction controller enacts a direction change to drive the drive motor with a second response curve having a reduced motor response for at least some throttle angles compared to the first response curve.

14 Claims, 3 Drawing Sheets

(56) References Cited

U.S. PATENT DOCUMENTS

| | | | | |
|---|---|---|---|---|
| 2011/0022286 | A1* | 1/2011 | Sato | B60K 26/02 701/99 |
| 2011/0080305 | A1 | 4/2011 | Toledo et al. | |
| 2013/0144492 | A1 | 6/2013 | Takano et al. | |
| 2015/0266491 | A1* | 9/2015 | Bergweiler | F02D 11/105 701/99 |
| 2016/0194002 | A1* | 7/2016 | Kelly | B60W 10/18 701/93 |
| 2020/0207334 | A1 | 7/2020 | Cho | |
| 2020/0269845 | A1* | 8/2020 | Hammarberg | B60W 10/10 |
| 2021/0269019 | A1 | 9/2021 | Chen et al. | |

OTHER PUBLICATIONS

International Searching Authority, "Notification of Transmittal of the International Search Report and the Written Opinion of the International Searching Authority, or the Declaration," Date of mailing: May 8, 2024, Date search was completed: Apr. 26, 2024.

Tesla, "Your Tesla gets better while you sleep Highlights from our upcoming Spring Release below," X.com, https://x.com/Tesla/status/1780266303326228508, Apr. 16, 2024, Accessed Mar. 31, 2025.

* cited by examiner

VEHICLE SYSTEM TO MITIGATE UNINTENDED DIRECTIONAL ACCELERATION

CROSS-REFERENCE TO RELATED APPLICATION

This application claims the benefit of U.S. Provisional Patent Application No. 63/635,108 filed on Apr. 17, 2024, entitled “VEHICLE GEAR SELECTION CONTROL,” which is hereby incorporated by reference in its entirety for all that is taught and disclosed therein.

FIELD OF THE INVENTION

The present invention relates to motor vehicle control systems, and in particular to safety systems to avoid damage due to unintended acceleration.

BACKGROUND AND SUMMARY OF THE INVENTION

Unintended acceleration of a vehicle has long been a concern and is most commonly understood in conjunction with driver application of an accelerator pedal when braking is intended. The psychology is understood to create panic that motivates the driver to press harder to gain the expected braking effect, as the vehicle instead accelerates.

Another form of unintended acceleration involves the direction of the acceleration. The driver error is not in the choice of pedal, but in the choice of direction (forward/drive vs. reverse). This can be a concern in systems with an unfamiliar or unconventional means of selecting direction, such as swiping a screen up or down, to select forward or reverse (as opposed to conventional levers or stalks). Some users may find it unintuitive which vertical direction is associated with forward or reverse. Others may occasionally believe that they have swiped the screen to change direction, but missed the correct zone and failed to change gears.

Unintended direction acceleration may also be a concern in systems with an automated or “smart” system that offers or implements direction changes, with the potential for an unexpected or unintended direction change. This relates to U.S. patent Ser. No. 11/932,230, the entirety of which is incorporated herein by reference. The above patent describes a system that is believed effective, but which may beneficially incorporate some added features or other improvements to avoid collisions than can occur when a vehicle accelerates in the direction not expected by the driver.

Vehicle vision systems and other object detection systems such as radar or Lidar may also mitigate these concerns, but may be limited in effect for rapid initial acceleration when obstacles are nearby, such as in a small garage.

In either type of error, the vehicle is about to proceed in the opposite direction expected by the driver. When there are obstacles, such as building structures, other vehicles, or pedestrians in the unexpected direction of travel, a collision may occur. Vehicles with higher power, including the “instant torque” associated with electric vehicles, may be particularly vulnerable because a collision may occur more quickly than can be avoided by a driver’s reaction to sensing the wrong-way acceleration. The time for a vehicle to reach an object may be briefer than the interval in which a driver naturally reacts to cease and correct the unintended directional acceleration.

Therefore, a need exists for a new and improved vehicle system to mitigate unintended directional acceleration that avoids damage due to unintended acceleration. In this regard, the various embodiments of the present invention substantially fulfill at least some of these needs. In this respect, the vehicle system to mitigate unintended directional acceleration according to the present invention substantially departs from the conventional concepts and designs of the prior art, and in doing so provides an apparatus primarily developed for the purpose of avoiding damage due to unintended acceleration.

The present invention provides an improved vehicle system to mitigate unintended directional acceleration, and overcomes the above-mentioned disadvantages and drawbacks of the prior art. As such, the general purpose of the present invention, which will be described subsequently in greater detail, is to provide an improved vehicle system to mitigate unintended directional acceleration that has all the advantages of the prior art mentioned above.

To attain this, the preferred embodiment of the present invention essentially comprises a frame, a motor connected to the frame, an accelerator pedal operable by a driver through a range of positions between a minimum throttle angle and a maximum throttle angle, a drive system operably connected to the accelerator pedal, to the motor, and to the wheels, the drive system operable to selectably drive the wheels in a forward direction in a drive mode and in a rearward direction in a reverse mode, the drive system including a direction controller operable to enact a direction change between a first one of the drive mode and the reverse mode and the other one of the drive mode and the reverse mode, the drive system operable in a standard mode to drive the motor with a first response curve based on the accelerator position, and the drive system operable in a safe mode immediately after the direction controller enacts a direction change to drive the drive motor with a second response curve having a reduced motor response for at least some throttle angles compared to the first response curve. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

DESCRIPTION OF THE CURRENT EMBODIMENT

Figure 1:
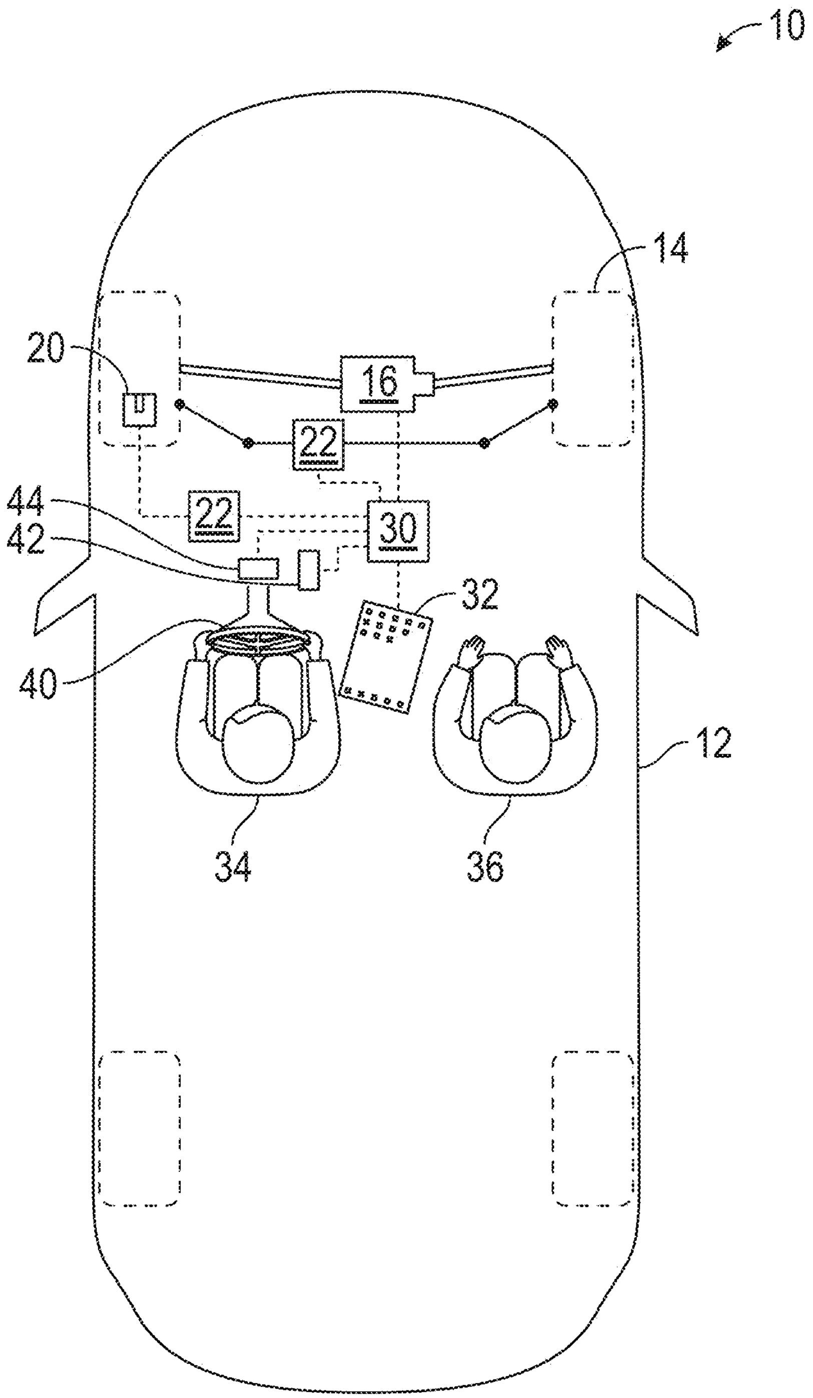
FIG. 1 is a schematic view of the current embodiment of a vehicle system to mitigate unintended directional acceleration constructed in accordance with the principles of the present invention installed in a vehicle.

An embodiment of the vehicle system to mitigate unintended directional acceleration of the present invention is shown and generally designated by the reference numeral 10.

FIG. 1 illustrates the improved vehicle system to mitigate unintended directional acceleration 10 of the present invention. More particularly, as shown schematically in FIG. 1, the system operates in a vehicle 10 having a frame or body 12 having wheels 14 that are driven by a motor 16. Brakes 20 are associated with each wheel and a brake cylinder 22 operates the brakes. A steering system 24 steers the front wheels.

A computer or controller 30 is connected to each of the above systems, including sensors to monitor operation of each system, and cameras or other sensors (not shown) that gather information about the vehicle's environment to enable autonomous or assisted driving. A passenger compartment includes a touchscreen display 32 connected to the controller and visible to a driver 34 and passenger 36 each occupying seats in the compartment. The display provides data entry capability and the controller also connects to audio speakers and microphones in the compartment for sending and receiving audio information with the occupants.

At the driver's side of the display near the left edge as shown, a vertical bar 38 may be displayed to provide a gear shift control. An upward swipe indicates a selection of forward travel in "drive" gear, and downward swipe indicates "reverse" for driving rearward for backing up.

Vehicle controls include a steering wheel or yoke 40 that is connected to the controller and may in some instances be selectably mechanically connected to the steering system 24 to enable direct mechanical control by the driver, electronic control by the driver via the controller, autonomous control by the controller with actuators or the mechanical connection moving the steering wheel in concert with the wheel angle, and combinations of these as selected or indicated by conditions. Similarly, an accelerator pedal 42 and brake pedal 44 are connected respectively to the motor 16, brake system 22, via the controller and optionally with some direct connection for driver and controller control over these functions.

Figure 2:
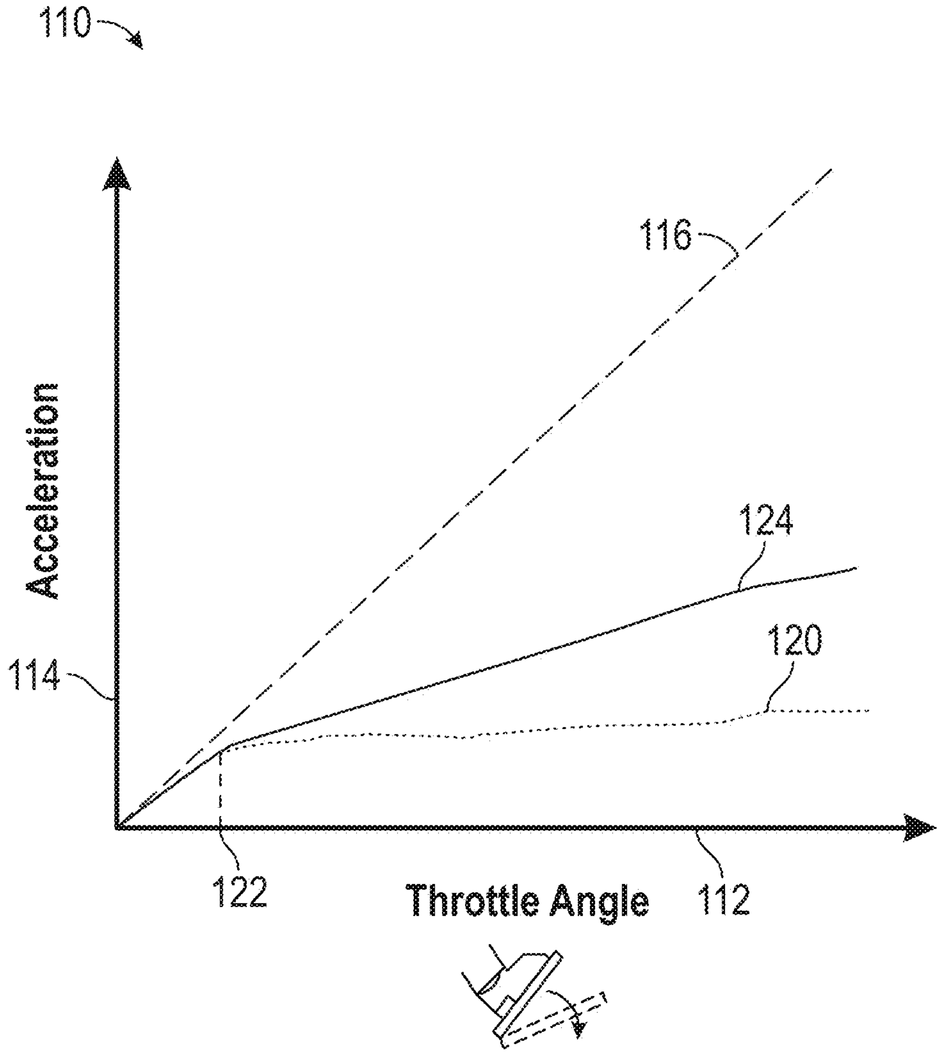
FIG. 2 is a graph comparing a standard acceleration profile with modified throttle response profiles enabled by the vehicle system to mitigate unintended directional acceleration.

FIG. 2 shows a graph 110 with throttle angle on horizontal axis 112 and vehicle acceleration on vertical axis 114. The normal linear (or other standard) acceleration profile or curve is a dashed straight line 116, for the simple case where it is proportional to throttle angle. The improved system shows the response line 120 that applies for a short or limited period after a potential direction change event, such as a stop, or direction change between drive and reverse (aka "gear shift"), or potential direction change, or other events discussed below when a direction change might be expected, or might have been intended but ineffectually executed. These included events in which the controller presumes and offers a direction change, but it is not accepted, or when the controller determines that a direction change is likely but does not occur. This may also include when obstacles are nearby in the presently selected direction and little headway is possible.

This modified throttle response line is on or near the normal response line for gentle pedal application below a throttle angle threshold 122, but for more than light pedal application, the acceleration response is limited. The response curve above this threshold pedal angle may be flat as shown with response line 120, so that additional pedal angle has no effect, or may be at least more gently sloped as shown in response line 124 so that the throttle response is weaker but available to a limited degree with extreme throttle angles to access moderate acceleration.

After the short period of reduced throttle response depicted in FIG. 2, the curve transitions to the normal response curve, which may be a gradual shift to avoid abrupt changes. This presents a challenge because pressing the pedal to a significant angle may then result in a troublesome transition in which the vehicle accelerates even without a changing pedal angle, leading to more unexpected vehicle motion. As an alternative to avoid this, a driving incident in which the pedal angle excels normal cautious parking lot actions and limited pedal angles below a selected threshold 122 indicating a significant inflection in the curve 120. Such an incident may be considered to have triggered an emergency intervention by the vehicle system to prevent the effects of an unintended extreme throttle input. Recovery from this may include a requirement that the driver lift the throttle to "reset" the normal throttle response. As noted above, an unexpected lurch of a vehicle in the opposite unexpected direction naturally results in a reflexive withdrawal of force on the accelerator pedal, and this would yield a normal reset.

The threshold may also shift in the moments after acceleration begins. In a simple embodiment, the threshold may increase to an unlimited angle after an interval has passed in which reflexive pedal lift would have occurred. However, an advanced system may have a low threshold in the first brief interval, then this may shift upward somewhat as fractions of a second pass. Another way of looking at this type of system feature is by being responsive the rate of pedal angle change, so that the system may respond to rapid angle changes that are unusual with inhibited acceleration.

Figure 3:
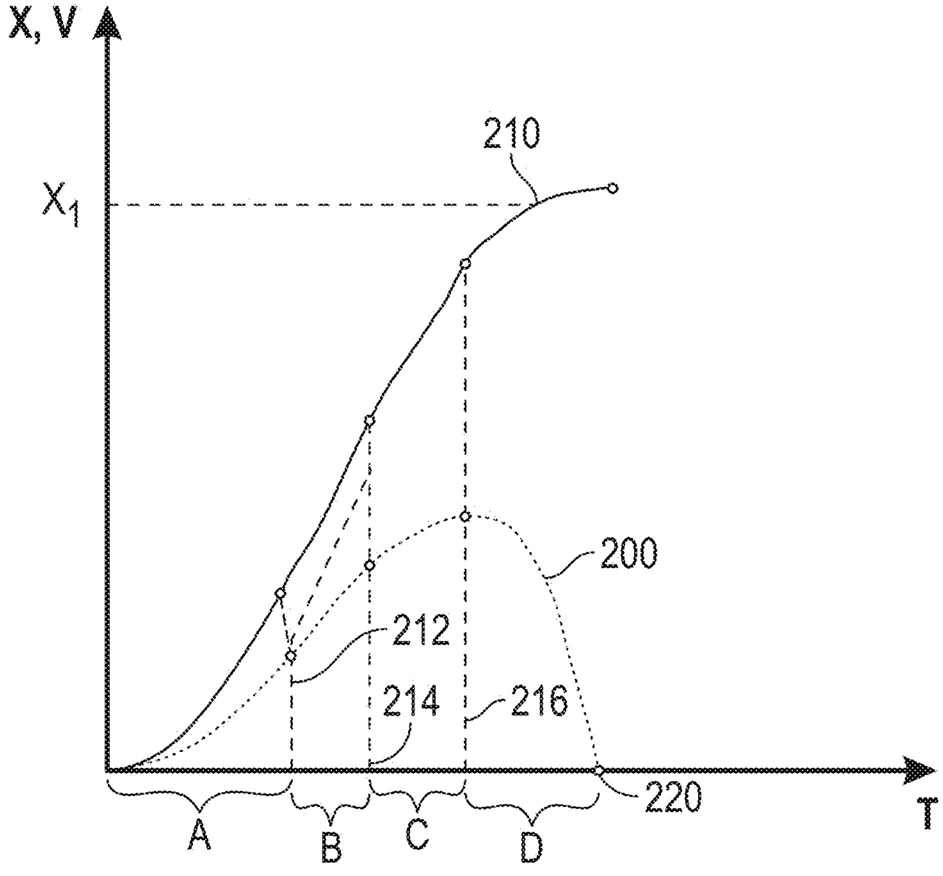
FIG. 3 is a graph depicting motion of a vehicle over time when it is in the “wrong gear” and travels in the opposite direction expected by the driver.

FIG. 3 depicts the motion of a vehicle over time when it is in the "wrong gear" and travels in the opposite direction expected by the driver. The vertical axis is vehicle velocity, and the horizontal axis is time. The motion curve 200 shows the speed of the vehicle, and the position curve 210 shows the distance traveled.

An unintended direction event may have several phases. Initially in interval A, the driver presses the accelerator pedal. During this, the vehicle reacts with motion, and this unexpected direction of motion is sensed by the driver's vestibular system and triggers a response that may be reflexive or conscious. The normal initial response is to lift the foot and withdraw pressure from the accelerator pedal at time 212, beginning interval B. This stops the acceleration, and may slow starting at time 214 beginning interval C due to friction, engine braking, or regenerative braking. As motion continues, the next reflexive or conscious response is to apply the brakes at time 216 beginning interval D to stop the wrong-way motion at time 220 when the vehicle has travelled a distance X1, hopefully before causing damage. The driver or vehicle then shifts and proceeds normally.

This is usually effective when drivers are cautious, such as using small throttle pedal angle applications for only light acceleration to slow speeds in parking circumstances such as when parked facing a barrier. This is an application of the system for proceeding from when parked. When changing gears, such as when backing out of a parking space in a crowded parking lot, the car may reverse into proximity with an obstacle such as another parked vehicle, then shift into drive. If Reverse is mistakenly or unexpectedly selected, or an intended shift not properly effected, throttle application will cause the vehicle to risk striking the other parked vehicle.

When drivers apply the throttle delicately, it is much more likely that velocities remain low, distances covered short, and correction (braking) adequately fast to prevent unwanted-direction travel more than a short, limited distance. This may be mere inches in many cases, and accidents avoided.

But in some instances, a driver may apply a greater throttle angle. This may be deliberate, such as a driver launching spiritedly from a red light. If that driver had earlier reversed such as to correct incursion into a crosswalk, then forgot to shift to drive, or had a failed attempt to shift to drive, a brisk acceleration would cause a crash with a car behind without hope of avoidance. In other circumstances, a driver's foot may slip and unintentionally "floor" the pedal. In other cases, some drivers may mistake the accelerator pedal for the brake, and apply what they believe is hard braking force causing greater acceleration. Other circumstances such as a loosely belted driver pressing the accelerator when unexpectedly in reverse may cause dangerous positive feedback as the reverse acceleration shifts the driver forward in the seat, further increasing pedal pressure and displacement that increases acceleration and pedal pressure. There are believed to be multitudes of other scenarios in which acceleration when unexpectedly in the wrong direction gear can cause avoidable crashes.

As discussed above during the phases of acceleration, the first phase of initially pressing the pedal concludes when the driver has received expected or unexpected direction feedback. Experimentation and existing research may assign a typical time interval for this moment of realization, and there will be a range of intervals for different drivers. It is believed that the reaction may occur when the vehicle has moved just a fraction of an inch, as the inertia of a person's head and vestibular system may provide adequate feedback even at very low velocities. However, it may be that an initial sharper acceleration (even to a fraction of a mile per hour, but to jerk even an inch or less abruptly) generates a more rapid reaction, perhaps enhanced by adrenaline.

While not necessarily preferred, the system may employ a more aggressive than typical initial jerk upon initial throttle application to trigger faster reaction, before changing to a depressed throttle response. However, this would likely not be preferable due to comfort drawbacks, and a standard throttle response upon initial accelerator application after a gear direction shift is preferred. It is also possible that experimentation would show that even gentle acceleration with depressed throttle response may be adequate to trigger driver reaction and it may be effective to depress throttle response after a shift even for initial acceleration after a shift. In the preferred embodiment, the acceleration is initially normal, then depressed. But this initial acceleration prior to the depressed period may be higher than normal, or depressed as with the subsequent period.

After the initial driver reaction to detect and react to wrong-way acceleration, there is another reaction point in the process: when even a slow-to-react driver has experienced the initial acceleration and has had ample time to react to it by lifting the foot from the accelerator and applying the brake. When this potential reaction point has passed, the control system of the vehicle may now be assured that the direction is correct, and then shift the throttle response from the depressed cautionary post-shift acceleration profile to the normal profile, enabling full throttle acceleration and expected accelerations at any selected throttle pedal angle.

The safety feature of a depressed throttle response after shifting may also be implemented to other circumstances when the direction may be different than expected by the driver. There are many circumstances when a driver may think they have shifted but haven't. These include: swiping the screen the wrong way, pressing a non-intuitive lever the wrong way, or making a failed attempt to swipe or move a lever. Auto-shift systems may require a sequence of inputs with steering and brakes that are occasionally not offered when expected in marginal circumstances. These circumstances of directional assumption error may be detected or presumed by the vehicle control or drive system when: the system has offered the driver a shift to change direction but it was not accepted; when vehicle imaging or sensors indicate an obstacle in the path; when driver monitoring systems indicate driver inattention is a concern; when a direction change is expected; when auto-shift parameters indicate that the likelihood a driver desires a shift is below the normal threshold needed to offer the shift; and when a driver has been stopped for a time, and when selecting a gear from park.

The system may offer optional additional options to adjust sensitivity. Drivers more prone to error and confusion and inadvertent shifts may prefer a setting in which every start from a stoplight was with an initially depressed throttle response, for instance. This may be selected for inexperienced or elderly drivers.

One concern with the system is in the transition from depressed throttle response to normal. If a driver starting up in a new direction had unwantedly depressed throttle response, it may feel like a sluggish vehicle problem, and cause the driver to apply additional pressure or throttle angle to get the wanted acceleration. When the standard acceleration profile returns this could create an unwanted additional acceleration and cause jerky driving or accidents. The system should monitor and be responsive to driver accelerator behavior and provide more satisfying response, including transition out of the depressed mode in response to driver action after initial limited acceleration. That way a driver with fast reflexes may initially start, then press more to get normally underway in a short interval. But even a skilled driver with excellent reflexes may be protected against a "dumb" initial heavy application of the throttle that follows a simple predictable smooth path to a large throttle angle, as opposed to an initial normal throttle application, followed by a blip of added throttle to overcome the diminished acceleration profile.

The initial phase A is the pedal press phase, in which the driver presses the pedal the velocity curve is concave upwards as the vehicle accelerates. At time 112, which is almost immediate, the driver's vestibular system registers that the motion is not as expected. Phase B follows and is the first reaction phase, as the driver realizes the error but has not yet taken action. This is depicted for simplicity as a straight line, as acceleration is ceased, but motion continues. At time 114, the realization phase ends, and action phase C begins, as the driver lifts the foot off the accelerator pedal, initially by reducing pressure and lifting its position. More precisely, the motion may slow due to friction, engine braking, or regenerative braking. With conventional vehicles this may be an application of the brakes, which continues in phase D until the vehicle stops.

While a current embodiment of a vehicle system to mitigate unintended directional acceleration has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motor vehicle comprising:
- a frame;
- a set of wheels connected to the frame; a motor connected to the frame;
- an accelerator pedal operable by a driver through a range of positions between a minimum throttle angle and a maximum throttle angle;
- a drive system operably connected to the accelerator pedal, to the motor, and to the wheels;
- the drive system operable to selectably drive the wheels in a forward direction in a drive mode and in a rearward direction in a reverse mode;
- the drive system including a direction controller operable to enact a direction change between a first one of the drive mode and the reverse mode and the other one of the drive mode and the reverse mode;
- the drive system operable in a standard mode to drive the motor with a first response profile based on the accelerator position;
- the drive system operable in a safe mode immediately after the direction controller enacts a direction change to drive the drive motor with a second response profile having a reduced motor response for at least some throttle angles compared to the first response profile; and wherein the direction controller is operable to change direction without operator indication of a direction.

2. The motor vehicle of claim 1 wherein the direction controller includes an operator shifting input control.

3. The motor vehicle of claim 1 wherein the drive system is operable to drive the drive motor with the second response profile having a reduced motor response for a limited time interval.

4. The motor vehicle of claim 3 wherein the drive system is operable to drive the drive motor with the first response profile having a reduced motor response after the limited time interval.

5. The motor vehicle of claim 1 wherein at least a portion of the second response profile is flat, such that no additional acceleration is provided after a selected throttle angle.

6. The motor vehicle of claim 1 wherein the second response profile is sloped at a limited angle less than the angle of the first response curve.

7. A motor vehicle comprising:
- a frame; a set of wheels connected to the frame
- a motor connected to the frame;
- an accelerator pedal operable by a driver through a range of positions between a minimum throttle angle and a maximum throttle angle;
- a drive system operably connected to the accelerator pedal, to the motor, and to the wheels;
- the drive system operable to selectably drive the wheels in a forward direction in a drive mode and in a rearward direction in a reverse mode;
- the drive system including a direction controller operable to enact a direction change between a first one of the drive mode and the reverse mode and the other one of the drive mode and the reverse mode;
- the drive system operable in a standard mode to drive the motor with a first response profile based on the accelerator position;
- the drive system operable in a safe mode immediately after an event associated with a potential direction change a direction change to drive the drive motor with a second response profile having a reduced motor response for at least some throttle angles compared to the first response profile; and wherein the direction controller is operable to change direction without operator indication of a direction.

8. The motor vehicle of claim 7 wherein the drive system is operable in the safe mode after initial application of the accelerator pedal following the event associated with a potential direction change.

9. The motor vehicle of claim 8 wherein the event associated with a potential direction change includes an event selected from the group including a stop, a direction change between drive and reverse, a potential direction change, an unaccepted offer of a direction change, and a presumed intended direction change.

10. The motor vehicle of claim 7 wherein the direction controller includes an operator shifting input control.

11. The motor vehicle of claim 7 wherein the drive system is operable to drive the drive motor with the second response profile having a reduced motor response for a limited time interval.

12. The motor vehicle of claim 11 wherein the drive system is operable to drive the drive motor with the first response profile having a reduced motor response after the limited time interval.

13. The motor vehicle of claim 7 wherein at least a portion of the second response profile is flat, such that no additional acceleration is provided after a selected throttle angle.

14. The motor vehicle of claim 7 wherein the second response profile is sloped at a limited angle less than the angle of the first response curve.

* * * * *